United States Patent [19]
Kreinberg et al.

[11] Patent Number: 5,108,055
[45] Date of Patent: Apr. 28, 1992

[54] CONDUIT HOLDER

[75] Inventors: Earl R. Kreinberg, Peoria; Marty E. Adcock, Scottsdale, both of Ariz.

[73] Assignee: AMP Incorporated, Harrisburg, Pa.

[21] Appl. No.: 754,784

[22] Filed: Sep. 4, 1991

[51] Int. Cl.⁵ .................................. F16L 3/08
[52] U.S. Cl. ........................ 248/71; 248/74.2; 24/543; 24/703.1
[58] Field of Search .............. 248/316.7, 71, 74.2, 248/73, 63, 68.1, 74.1, 74.5; 24/543, 703.1, 115 A

[56] References Cited

U.S. PATENT DOCUMENTS

| | | | |
|---|---|---|---|
| 2,749,383 | 6/1956 | Pigman et al. | 174/84 |
| 3,410,950 | 11/1968 | Freudenberg | 174/84 |
| 3,444,596 | 5/1969 | Soltysik | 248/73 |
| 3,501,117 | 3/1970 | Soltysik | 248/71 |
| 3,514,528 | 5/1970 | Ray | 174/64 |
| 3,526,381 | 9/1970 | Pepe | 248/71 |
| 3,553,347 | 1/1971 | Harding et al. | 174/84 |
| 3,715,456 | 2/1973 | Faulkner | 174/84 C |
| 3,838,387 | 9/1974 | Grillet | 339/244 UC |
| 4,327,887 | 5/1982 | Kumakura | 248/73 |
| 4,875,876 | 10/1989 | O'Loughlin | 439/431 |
| 4,922,058 | 5/1990 | Rodrigues | 174/94 R |
| 4,958,792 | 9/1990 | Rinderer | 248/74.2 |

FOREIGN PATENT DOCUMENTS 731999 2/1943 Fed. Rep. of Germany .

OTHER PUBLICATIONS

U.S. Ser. No. 07/624,858, Kreinberg et al., Abstract & Drawings.
U.S. Ser. No. 07/754,884, Kreinberg et al., Abstract & Drawings.
U.S. Ser. No. 07/754,873, Kreinberg et al., Abstract & Drawings.

*Primary Examiner*—Blair M. Johnson
*Attorney, Agent, or Firm*—Anton P. Ness

[57] ABSTRACT

A conduit holder is a one-piece stamped and formed member (10) which includes an outer section having outer walls (14,16) extending from a base section (12) mountable to a wall (92) to form a conduit-receiving region (18) therein, outer sections (20,22) of said outer walls (14,16) being crimpable toward each other into a vertical orientation when applied around a conduit (90). An inner or clamping section (30) extends integrally from the end of one outer wall section (20) and is latchable to the end of the other (22) and includes a pair of inner wall sections (36,40) joined by a central arcuate portion (38) crossing the top of the region (18). When the outer and inner walls (20,36;22,40) are crimped to a vertical orientation, the rotated inner walls (36,40) urge the central portion (38) against the conduit which in turn is clamped against surfaces (68) of a spaced pair of platforms (60) raised from base section (12), and conduit (90) is thus secured within member (10).

11 Claims, 3 Drawing Sheets

CONDUIT HOLDER

FIELD OF THE INVENTION

This relates to the field of conduit holders, and more particularly to holders which are applicable with the use of simple tools.

BACKGROUND AND SUMMARY OF THE INVENTION

It is desirable to provide an article which is adapted to be mounted to panels or walls and to hold conduits thereto such as pipe of relatively small diameter and thin metal, with the use of only simple hand tools such as pliers.

The present invention is a one-piece stamped and formed clamp component having a base section, a pair of side walls extending therefrom defining a conduit-receiving region, and a clamping section extending from a first one of the side walls. The base section is fastened to a wall or panel with the clamping section in an initially open orientation, and the conduit is placed between the side walls. The clamping section is eventually rotated toward the conduit and latched to the second side wall to close the conduit-receiving region. The component in the closed state is then crimped into clamping engagement by outer extents of the side walls being pressed toward each other, forcing the clamping section inwardly against the conduit.

The base section includes a transverse plate portion adapted to be mounted to a wall or panel by a fastener and also includes spaced conduit-supporting platforms extending into the conduit-receiving region and shaped to engage the outer surface of the conduit placed into the conduit-receiving region. The side walls have conduit-proximate first sections adjacent the base section which are substantially vertical, and second sections initially diverging extending from bendable joints with said first sections and extending to inwardly-tent-back sections at outer extents. The clamping section extends integrally from the bent-back section of the first side wall initially outwardly from the conduit-receiving region and includes a hinge joint about which the clamping section is rotatable, and continues therefrom to include a first inner wall section, a central portion, and a second inner wall section concluding in a bent-back free end.

When the component has been fastened to a wall or panel, a portion of the continuous conduit is placed into the conduit-receiving region and adjacent the support platforms. The clamping section is then rotated to a closed position about the hinge joint, and the bent-back free end latches in the slot defined by the bent-back section of the other side wall, thus bringing the central portion of the clamping section at least proximate the surface of the conduit. With the use of a tool such as a pair of pliers, the diverging second wall sections are bent about the bendable joints and rotated toward each other into a vertical orientation, and in turn urge the inner wall sections also into vertical alignment. Rotation of the inner wall sections urges the central portion toward the base section for the central portion to tightly engage the adjacent surface of the conduit and urge the conduit against the platforms of the base section.

It is an objective of the present invention to provide a conduit holder of one piece which is capable of being fabricated at low cost and is easily applied using a simple tool.

An embodiment of the present invention will now be described by way of example with reference to the accompanying drawings.

DETAILED DESCRIPTION OF THE PREFERRED EMBODIMENT

Figure 5:
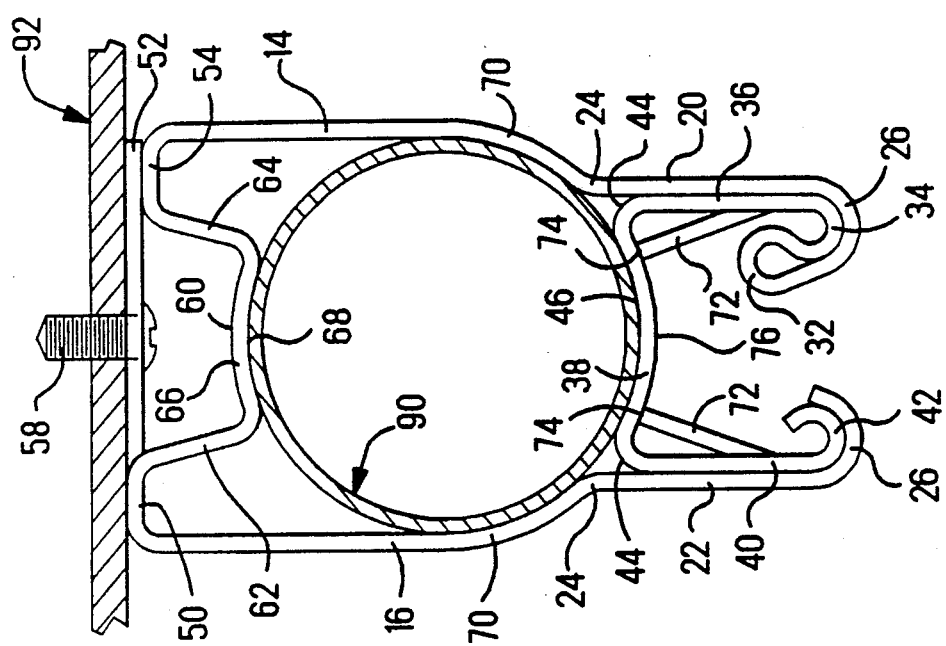

Conduit holder 10 is a single component stamped and formed from a strip of metal such as zinc-plated low carbon steel, and is appliable to an intermediate portion of a continuous length of conduit. A typical conduit 90 may be of thin metal generally having a diameter of about one-half inch but may vary. Holder 10 includes a base section 12 and lower wall sections 14,16 extending vertically therefrom to define a conduit-receiving region 18, and upper wall sections 20,22 continue outwardly from lower wall sections 14,16 at bendable joints 24 initially diverging outwardly to bent-back portions 26 at outer extents thereof which form slots 28. Initially, upper wall sections 20,22 are oriented at selected angles $\alpha$ from vertical (FIG. 5).

Figure 4:
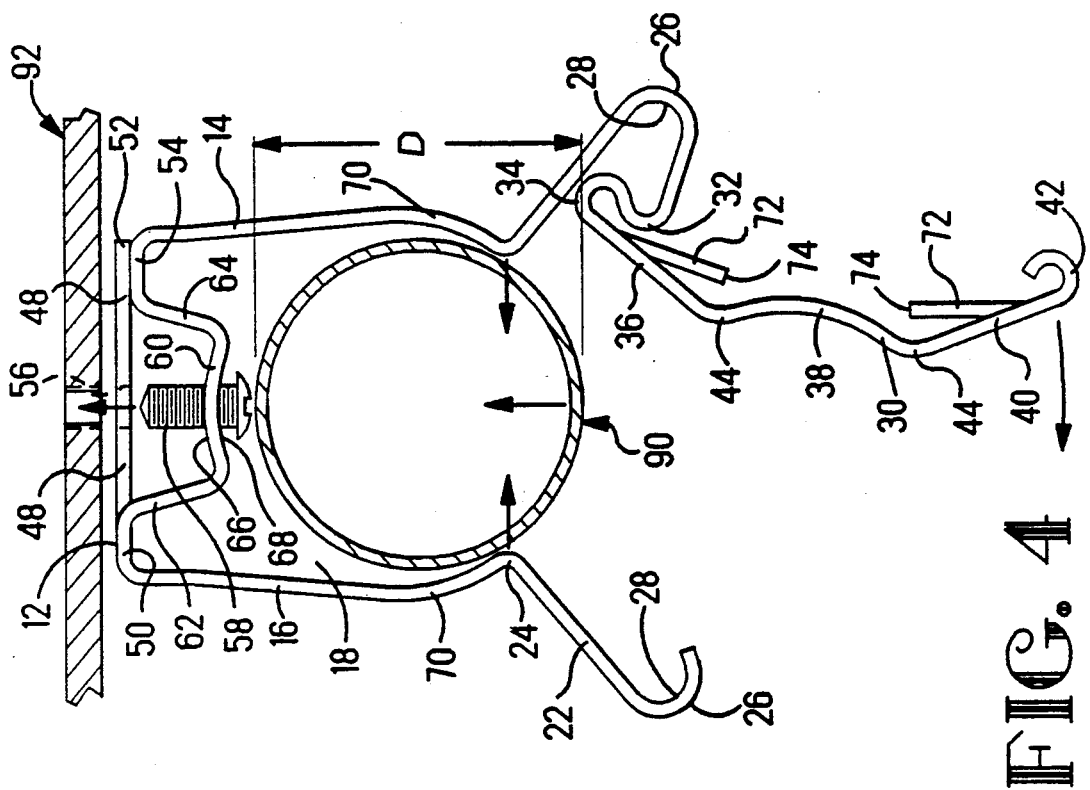
FIGS. 4 to 6 are elevation views of the conduit holder prior to mounting, after mounting and after crimped application to a conduit, respectively.
Figure 6:
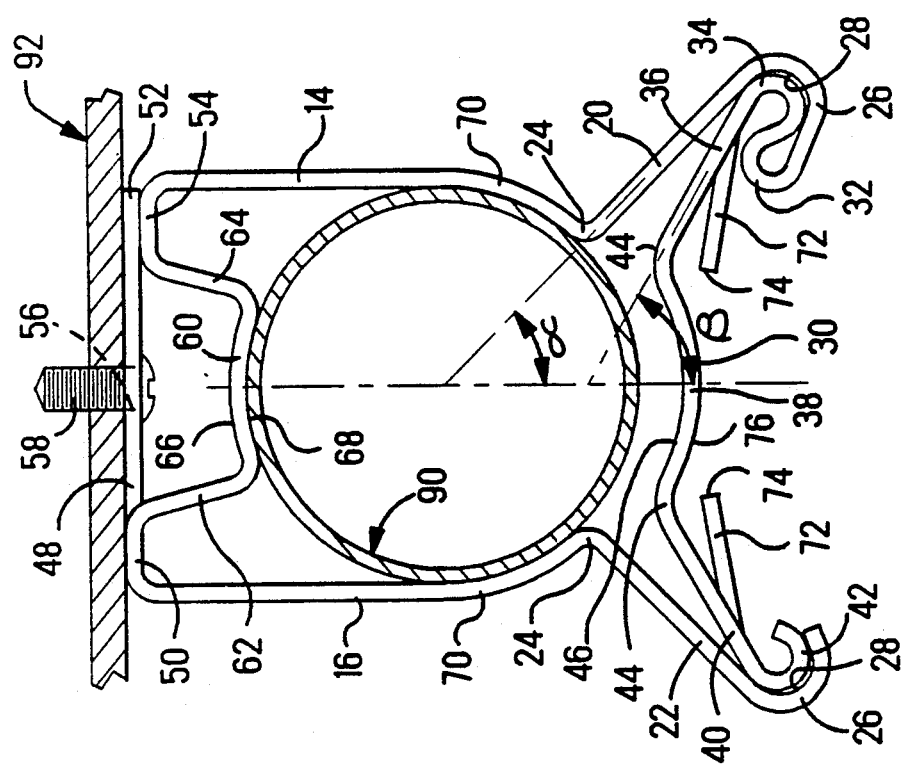

Clamping section 30 extends from upper wall section 20 and includes a hinge joint 32 integral with bend 26 thereof, a first bend 34 extending from hinge joint 32, and in succession a first inner wall section 36, an arcuate central portion 38, and a second inner wall section 40 concluding in a second bend 42. Initially, clamping section 30 extends in a direction generally away from base section 12 permitting the holder to be easily mounted to a panel or wall and then receive thereinto an intermediate portion of continuous length of conduit (FIGS. 4 to 6). Central portion 38 is arcuate outwardly and joins inner ends of inner wall sections 36,40 at radiused third bends 44. The concave inwardly facing surface of central portion 38 defines clamping surface 46 associated and engageable with a surface of the conduit upon crimping, with the radius of concave clamping surface 46 generally equal to the radius of the conduit.

Figure 2:
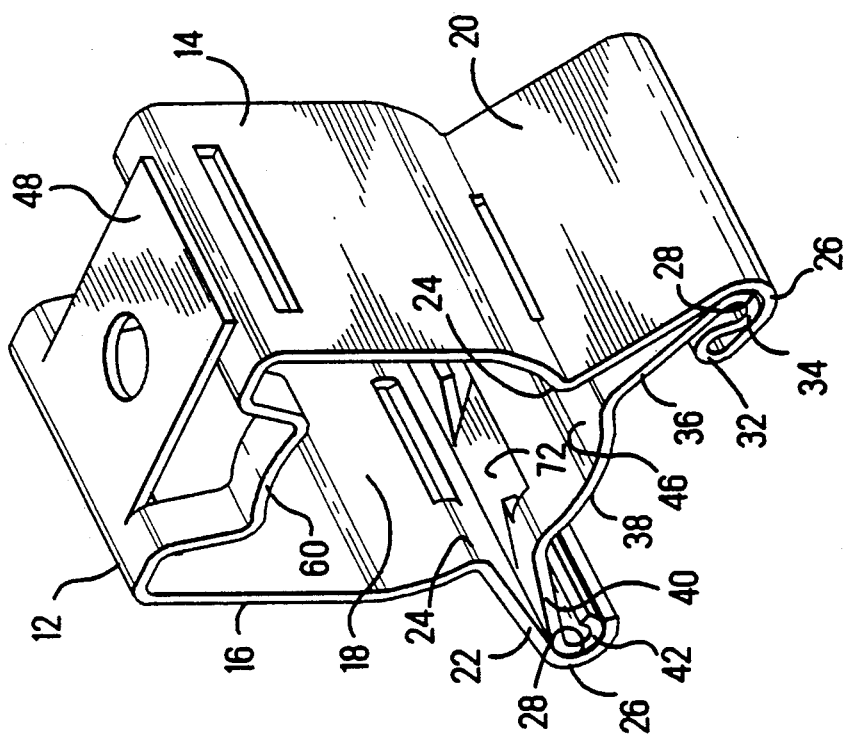
FIGS. 1 to 3 are isometric illustrations of the conduit hold the present invention in an open, closed and fully crimped configuration respectively with the conduit not shown.
Figure 1:
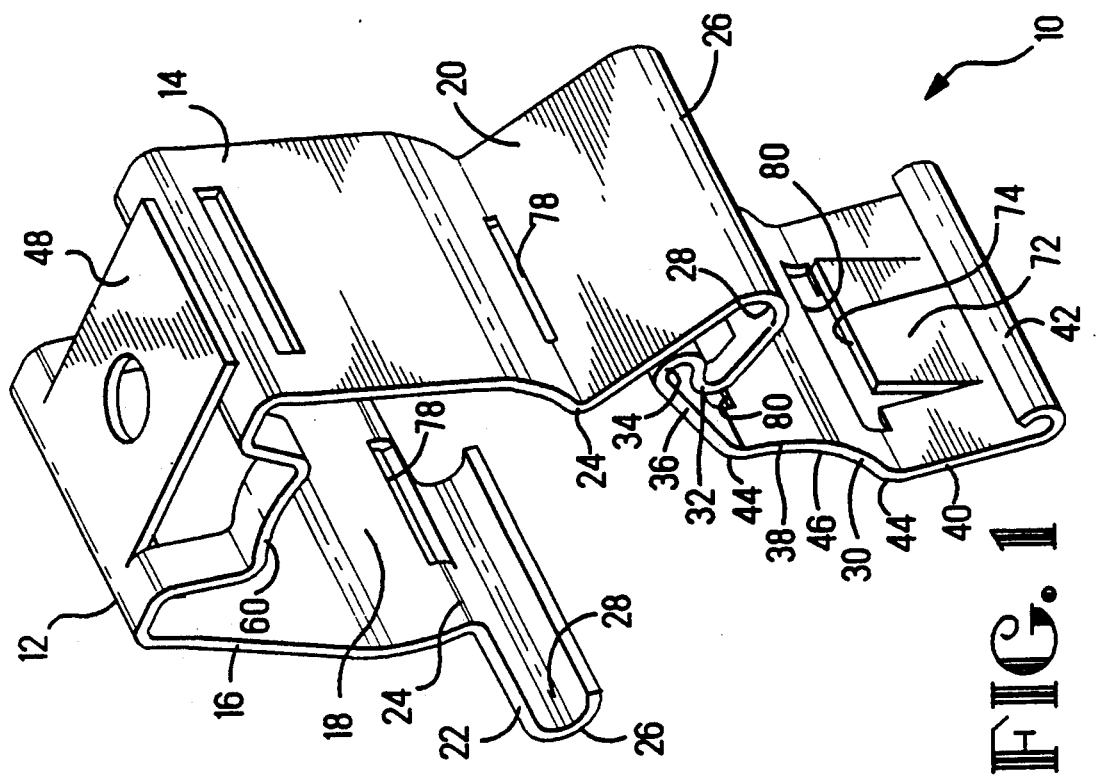

Referring to FIG. 2, clamping section 30 has been rotated to bend about hinge joint 32 to extend between the outer extents of second wall sections 20,22 (termed outer walls). First and second bends 34,42 are disposed within slots 28 inside of bends 26 at the outer extents of outer walls 20,22, with second bend 42 latched within the respective slot 28 under spring bias generated by hinge joint 32. Inner walls 36,40 now extend toward base section 12 within outer walls 20,22 and are now oriented at selected angles $\beta$ from vertical (FIG. 5) which are greater than angles $\alpha$ of outer walls 20,22.

Figure 3:
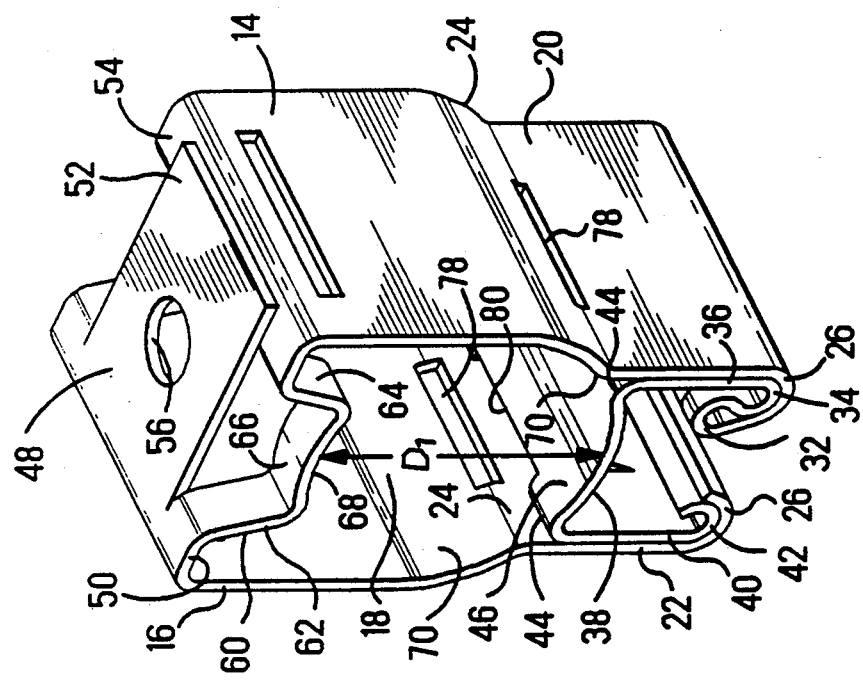

With respect to FIG. 3, base section 12 includes a plate portion 48 extending transversely with respect to first wall sections 14,16 from a transverse lower extent 50 of first wall section 16 to a free end 52 which is disposed adjacent a transverse lower extent 54 and preferably spot welded thereto. Plate portion 48 includes an aperture 56 into which a fastener such as a self-tapping screw 58 is insertable to mount holder 10 to a panel or wall 90 (FIGS. 4 to 6). Base section 12 also includes a pair of integral conduit-supporting platforms 60 extending into conduit-receiving region 18 from both sides of plate section 48 and joined integrally to lower extents 50,54 of first wall sections 16,14 by generally vertical legs 62,64. Each platform 60 includes an arcuate central portion 66 joined to legs 62,64 which defines a concave clamping surface 68, and the concave clamping surfaces 68 are spaced apart axially with respect to the conduit to engage the conduit surface at two spaced locations therealong.

FIG. 3 illustrates conduit holder 10 in its crimped condition in which it would be clamped about a conduit 90 extending through conduit-receiving region 18. Outer walls 20,22 and inner walls 36,40 have been rotated into a vertical orientation by being bent at bendable joints 26 by using a pair of pliers (not shown). Slightly converging portions 70 of first wall sections 14,16 preferably are arcuate to engage and conform generally to the arcuate surface of the conduit along both sides of clamping surface 46. Altogether, clamping surface 46, wall portions 70 and clamping surfaces 68 of platforms 60 tend to define a conduit-receiving region 18 when holder 10 is closed and crimped having a diameter $D_1$ slightly smaller than the diameter of the conduit to be placed therewithin, thus clampingly engaging the conduit upon application.

In FIGS. 4 to 6, conduit holder 10 is shown first being mounted to a panel or wall 92 by a fastener 58 and then being mounted to a conduit 90 having a known outer diameter D for which the holder has been specifically fabricated. A fastener 58 such as a self-tapping screw can easily be inserted through aperture 56 of plate portion 48 of base section 12, prior to insertion of conduit 90 into conduit-receiving region 18, and then into a corresponding aperture of panel or wall 92. An intermediate portion of continuous conduit 90 can easily be inserted into conduit-receiving region 18 by being urged past the constriction formed at bendable joints 24 by converging portions 70 of first wall sections 14,16, by deflecting converging portions 70 outwardly.

FIG. 5 illustrates conduit 90 engaged by and held within conduit-receiving region 18 by converging portions 70 and clamping surfaces 66 of platforms 60. Clamping section 30 has been rotated about hinge joint 32 toward conduit 90 until second bend 42 at the free end of second inner wall section 40 is received into slot 28 defined by bent-back portion 26 of outer wall 22, and latches therein thus closing conduit-receiving region 18 about conduit 90. First bend 34 is also disposed within corresponding slot 28 of bent-back portion 26 of outer wall 20. Support lances 72 are seen formed from first and second inner walls 36,40 to extend toward each other outwardly of central portion 38 to free ends 74 associated with and proximate to respective bendable joints 44. Angles α may be from about 30° to about 60° and preferably are about 45°, while angles β may be from about 40° to about 70° and preferably are about 55°.

Conduit holder 10 has been crimped about conduit 90 in FIG. 6, deformed by pliers (not shown) into a fixed state clamped to and around the conduit. Outer walls 20,22 have been rotated into a generally vertical alignment, bent at joints 24 and in turn bending first and second inner walls 36,40 also to a vertical orientation, bent at joints 44. With inner walls 36,40 being necessarily rotated through a greater angle than outer walls 20,22, central portion 38 is translated toward conduit 90 and clamping surface 46 is now tightly clamped against the adjacent outer surface of conduit 90. Support lance free ends 74 now are engaged along the outer surface 76 of central portion 38 just inwardly from joints 44 providing support thereat to central portion 38 during crimping to assure controlled deformation of bendable joints 44 for clamping surface 46 to engage conduit 90. Slots 78 facilitate bending at the desired location of joints 24, while slots 80 similarly facilitate bending at joints 44 (see FIG. 3).

In the present invention, the holder is fastened to a wall and holds the conduit even prior to crimping, allowing a person to devote attention to crimping the holder to its final configuration instead of holding the conduit within the holder. While the holder could be fastened to a wall by other methods, in the example shown after mounting the holder to the wall, the fastener is clear of engagement with the conduit and does not interfere. Variations may be devised to the specific embodiment disclosed herein, which are within the spirit of the invention and the scope of the claims.

What is claimed is:

1. An article for holding a portion of a conduit to a wall, comprising:

a one-piece stamped and formed metal member including a base section and opposing outer walls extending generally at right angles from said base section to outer extents, and a clamping section extending integrally from a hinge joint with said outer extent of one of said outer walls and including a first inner wall section, a central portion and a second inner wall section concluding in a latching means, said first and second inner wall sections being joined to said central portion at bendable joints and having outer extents remote from said bendable joints, said clamping section being rotatable against spring bias toward the other of said outer walls to latch with cooperating latching means of a said outer extent of the other of said outer walls in a closed position, said base section defining a wall-mounting portion and conduit-engaging portions having conduit-clamping surfaces together with inner surfaces of said outer walls defining a conduit-receiving region therewithin;

said outer walls having outer sections, and said first and second inner wall sections being disposed proximate inside surfaces of said outer wall outer sections when said clamping section is latched in its closed position, said outer sections of said outer walls diverging at a selected first angle from vertical, and said first and second inner wall sections diverging at a slightly greater selected angle from vertical when said clamping section is in its closed position;

said outer wall outer sections including engagement means proximate outer extents thereof firmly engageable during crimping with cooperating engagement means of said first and second inner wall sections at outer extents thereof, whereby with said conduit positioned along said conduit-receiving region and when said outer sections of said outer walls are deformed by being rotated toward each other about said conduit, said first and second inner wall sections therebetween are correspondingly rotated by said outer wall outer sections toward each other about said bendable joints and said cooperating engagement means are engaged by said engagement means and cause said first and second inner wall sections to urge said central portion of said clamping section toward said base section pressing against said conduit, and said member is deformed into a crimped condition clamped to said conduit.

2. An article as set forth in claim 1 wherein said bendable joints are rounded to facilitate bending thereat.

3. An article as set forth in claim 1 wherein said engagement means comprises said outer extents of said outer wall outer sections being bent back along said inside surfaces thereof to define slots, and said cooperating engagement means comprises said outer extents of said first and second inner wall sections being bent back and shaped to be received into said slots upon said clamping section being rotated into said closed position and to fit snugly within said slots upon full crimping of said member about said conduit.

4. An article as set forth in claim 1 wherein said central portion of said clamping section is arcuate away from said base section to define a concave clamping surface having a radius about equal to the radius of said conduit.

5. An article as set forth in claim 1 wherein said first and second inner wall sections each include a support lance extending inwardly therefrom to a free end proximate to and outwardly of a respective bendable joint to engage and support outer surface portions of said central portion on each side therealong during final stages of crimping to assure uniform bending thereof.

6. An article as set forth in claim 1 wherein each of said outer wall outer sections are oriented at a first selected angle of about from 30° to about 60° from vertical, and each of said first and second inner wall sections are oriented at a second selected angle greater than said first selected angle.

7. An article as set forth in claim 6 wherein said second selected angle is about from 40° to about 70° from vertical.

8. An article as set forth in claim 7 wherein said first selected angle is about 45° and said second selected angle is about 55°.

9. An article as set forth in claim 1 wherein said wall-mounting means is a plate portion extending transversely from a transverse portion of one of said outer walls at least to a transverse portion of the other of said outer walls, and including an aperture therethrough adapted to receive a fastener therethrough.

10. An article as set forth in claim 9 wherein said conduit-engaging means is a spaced-apart pair of platforms expressed integrally from said transverse portions of said outer walls each including a spaced pair of leg portions extending into said conduit-receiving region along opposing sides of said plate portion, each said pair of leg portions being integrally joined by a central platform portion comprising a said conduit-engaging surface, said central platform portions spaced axially along said conduit upon said member being secured therearound.

11. An article as set forth in claim 10 wherein said central platform portions are arcuate and concave with respect to said conduit-receiving region, to conform to an outer surface of said conduit.

* * * * *